July 18, 1950 J. HAANTJES 2,515,597
PULSE SHAPING NETWORK TO DERIVE SYNCHRONIZING
PULSES FOR TRIGGERING A GENERATOR
Filed July 20, 1946

INVENTOR
JOHAN HAANTJES
BY [signature]
AGENT

Patented July 18, 1950 2,515,597

UNITED STATES PATENT OFFICE 2,515,597

PULSE SHAPING NETWORK TO DERIVE SYNCHRONIZING PULSES FOR TRIGGERING A GENERATOR

Johan Haantjes, Eindhoven, Netherlands, assignor to Hartford National Bank and Trust Company, Hartford, Conn., as trustee Application July 20, 1946, Serial No. 685,154
In the Netherlands June 15, 1945

Section 1, Public Law 690, August 8, 1946
Patent expires June 15, 1965

3 Claims. (Cl. 178—7.3)

In the transmission of stationary or moving images, in which line and image synchronizing pulses are transmitted with the image current, it is known to separate the image synchronizing pulses from the line synchronizing pulses by converting the pulses having like amplitudes but differing duration into pulses of different amplitudes and by selecting these by means of an amplitude filter. For this purpose the mixture of image and line synchronizing pulses is supplied to the series combination of a resistance and a condenser, the time constant of which is so high that during the occurrence of the comparatively short line synchronizing pulses across the condenser a but low voltage is set up, whereas during the image synchronizing pulses, which have a considerably longer duration, the condenser is charged up to a so much higher voltage that the latter is capable of overcoming a threshold voltage and thus can be separated. The time which elapses between the beginning of an image synchronizing pulse and the moment at which the condenser voltage reaches the threshold voltage depends on the amplitude of the pulse, so that when this amplitude is subjected to variations, the said time also varies. This results in the regularity of the synchronization of the image sawtooth generator in the receiver being upset.

The object of the invention is to provide a method of synchronizing an image sawtooth generator, by which this deficiency can be obviated. The invention utilises the fact that in the transmission method of interlaced scanning which at present is solely in use, the image synchronizing pulses are interrupted by pulses having double the frequency of the line synchronizing pulses.

According to the invention, the synchronization of the image sawtooth generator is effected at the end of the first interruption pulse.

This method can be carried out by supplying the mixture of image and line synchronizing pulses to a network, the characteristic response curve of which rises at first, then drops for a time approximately equal to the duration of a line synchronizing pulse, and then rises again, this rise terminating after a time approximately equal to the time elapsing between the beginning of the image synchronizing pulse and the first interruption pulse, and by so adjusting the threshold sensitiveness of the image sawtooth generator as to be exceeded only by the output voltage of the network occurring at the end of the first interruption pulse.

The characteristic response curve of a network is to be understood to mean in this case the output current or voltage occurring when suddenly a direct voltage is applied to the input terminals.

In order that the invention may be clearly understood and readily carried into effect, it will now be described more fully with reference to the accompanying drawing.

Figure 1:
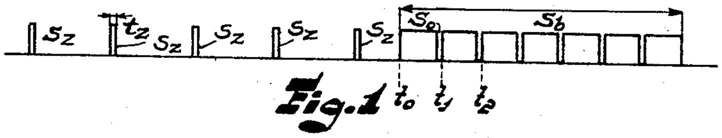

Fig. 1 illustrates the mixture of line and image synchronizing pulses as obtained in the receiver during the transmission of images scanned by interlacing and having an odd number of lines per image, after the image currents are separated therefrom. A number of line-synchronizing pulses are designed $S_z$ and an image synchronizing pulse $S_b$. The latter is interrupted by pulses $S_0$ which have double the frequency of the line-synchronizing pulses and may have the same time period or be of shorter duration. It is observed that the beginning of an image synchronizing pulse falls alternatively between two lines and at the beginning of a line and that the figure illustrates the first case.

According to the invention the synchronization of an image sawtooth generator is so affected as to occur at a moment $t_1$ at the trailing edge of the first interruption pulse. For this purpose the pulse mixture shown in Fig. 1 is converted into that of Fig. 2, a voltage pulse occurring at the end of each interruption pulse, at the moments 1, $t_2$ and so forth which exceeds the voltage pulse that occurs during the line synchronizing pulses at the beginning $t_0$ of the image synchronizing pulse. If the threshold sensitiveness of the image sawtooth generator is fixed by the voltage A, the synchronization of this generator will occur at the moment $t_1$, which is not subjected to any appreciable change when the amplitude of the incoming pulses varies, since the front flank of the voltage pulse is very steep. The synchronization will consequently always take place at a constant time at the beginning of the image synchronizing pulse.

Figure 2:
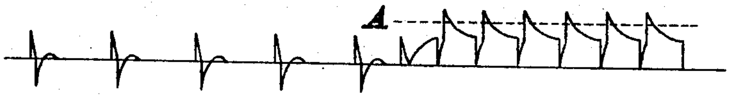
Figures 3, 4, 5, 6, 7, 8, 9, 10, 11, 12:
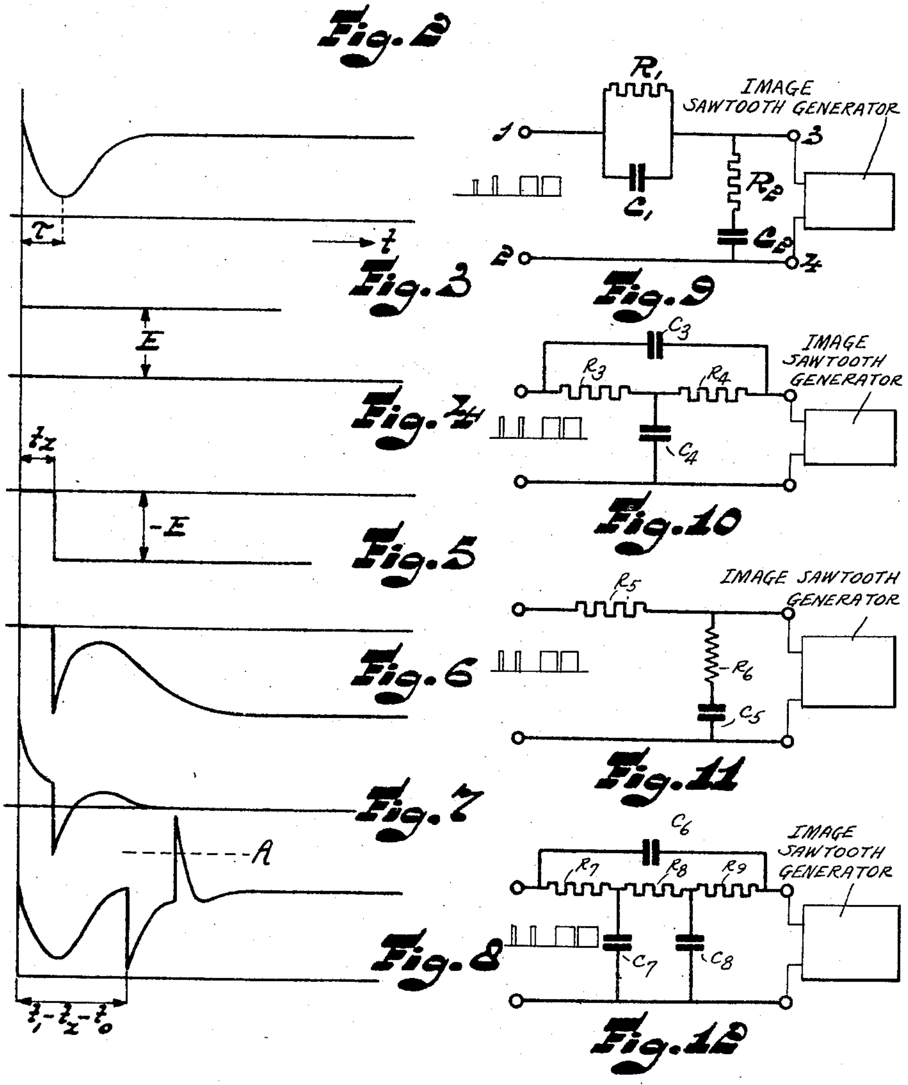

The conversion, of the pulses shown in Fig. 1 into those of Fig. 2 is achieved in accordance with the invention, by means of a network, the characteristic response curve of which varies in the manner shown in Fig. 3. This characteristic curve represents the output current or voltage of the network as a function of the time $t$ when at the time $t=0$ a direct voltage E is suddenly applied to the input terminals. This step voltage is shown in Fig. 4. The line and image pulses have the same magnitude as voltage E but they are of a definite duration. For times smaller than $t=0$ the voltage is zero and at the time $t=0$ it leaps to the value E, which further remains maintained. The voltage consequently brings about the output current or voltage shown in Fig. 3, which suddenly increases at the instant $t=0$, then decreases and eventually increases again, the time T and the duration $t_z$ of a line-synchronizing pulse being approximately equalized.

In order to show that a network having a characteristic response curve as shown in Fig. 3, supplies in actual fact the output current or voltage shown in Fig. 2, on the input terminals having supplied to them the pulse mixture shown in Fig. 1, it will first of all be ascertained how the output current or voltage behaves on a line-synchronizing pulse having the time period $t_z$ being supplied to the network.

It may be assumed that such a pulse arises from the voltage shown in Fig. 4 and from a voltage of the same form which appears a time $t_z$ later and is of opposite polarity, as shown in Fig. 5. The voltage of Fig. 4 yields the output voltage or current of Fig. 3. The voltage of Fig. 5 yields the same output current or voltage, however of opposite polarity and starting a time $t_z$ later, as shown in Fig. 6. The output current or voltage developed by a line synchronizing pulse is consequently found by addition of the curves of Figs. 3 and 6. The result is shown in Fig. 7 and from this it is apparent that the line-synchronizing pulses are converted in actual fact into the pulses shown in Fig. 2.

It may be assumed that the output current or voltage of the network developed by the image pulse and its first interruption pulse are built up from the output current or voltage of Fig. 3 generated by a voltage pulse as shown in Fig. 3 and from the output current or voltage of opposite polarity which is developed by a line-synchronizing pulse (that is to say the current or voltage shown in Fig. 7 assumed to have opposite polarity) and which appears a time $t_1—t_z—t_0$ (Fig. 1) later, this being the time which elapses between the beginning of the image pulse and the beginning of the first interruption pulse. The result which is shown in Fig. 8 is identical with that shown in Fig. 2 for the converted image pulses.

It is self-evident that a similar result is achieved when the interruption pulses are of shorter duration than the line-synchronizing pulses; it will furthermore be obvious that with a view of obtaining a maximum amplitude of the current or voltage peak occurring at the end of the first interruption pulse it is desirable that the second increase of the characteristic responsive curve should terminate in a time period approximately equal to the time which elapses between the beginning of the image pulse and the first interruption pulse.

Now it will be evident from Fig. 3 that if voltage E is suddenly applied to the input terminals of the network and then maintained for an indefinite period, the response curve will at first rise sharply, then drop for a predetermined period, and then rise again to a level predetermined by the applied voltage and thereafter remain at this level as long as voltage E is imposed on the network. It will further be evident that should voltage E be of negative polarity, the response curve would be reversed in sense. Voltage E in Fig. 4 represents a voltage of such duration as to permit the output curve of the network to run its full course. However, in the case of an applied voltage, such as a line or image pulse having a definite duration which is less than the time required for the completion of the curve cycle, the shape of the output curve will be determined by this factor. This effect is demonstrated in Figures 7 and 8.

Fig. 7 illustrates the waveform of the network output in response to an applied line pulse $S_z$ (Fig. 1). In analyzing the effect of a voltage pulse $S_z$ on the network it is important to bear in mind that the leading edge of the pulse indicates the sudden application of a voltage E (in the positive sense) to the network, the width of the pulse represents the duration of the applied voltage E, and the trailing edge of the pulse represents the sudden withdrawal of E (in the negative sense) from the network. Hence the effect of the applied line pulse $S_z$ on the output of the network is the same as the application of a step voltage E of Fig. 4 for the period $t_z$, during which time the curve rises in the positive direction and then drops. Thereupon the voltage of the pulse abruptly reverses in direction as through a negative step voltage E as shown in Fig. 5 were applied to the network thereby causing the network to yield the same output voltage as shown in Fig. 3 but of opposite polarity, this effect being shown in Fig. 6. The output current or voltage developed by the total effect of line pulse $S_z$ is consequently found by the additioon of the curve of Fig. 3 for the period $t_z$ and the curve of Fig. 6. The resultant waveform is indicated by Fig. 7 and from this it is apparent that the line pulses $S_z$ are converted by the network into the pulses shown on the left side Fig. 2.

A single waveform of the type on the right side of Fig. 2 is shown in Fig. 8 which represents the output developed by image pulse $S_b$ and its first interruption pulse $S_0$. The analysis of this wave follows along the same line advanced in connection with Fig. 7. It will be seen in Fig. 8 that the curve is the same as that in Fig. 3 for the time period which elapses between the leading edge of image pulse $S_b$ and the leading edge of the first interruption pulse $S_0$. At the termination of this period, the curve has again risen after having dropped. With the advent of the leading edge of interruption pulse $S_0$ the polarity of the applied voltage reverses so that the curve then falls abruptly and thereafter continues to rise slowly for the duration of pulse $S_0$ in accordance with the network characteristic. Finally, with the trailing edge of pulse $S_0$, which is in the positive direction, the curve abruptly rises to a high level, thereby providing the synchronizing voltage for the saw-tooth generator.

Figs. 9, 10, 11 and 12 represent networks having the characteristic response curve shown in Fig. 3.

The network shown in Fig. 9 is constituted by the series combination of two impedances connected between the input terminals 1, 2. One of the impedances is formed by a resistance $R_1$ parallel with a condenser $C_1$, the second by a resistance $R_2$ in series with a condenser $C_2$. The output terminals 3 and 4 are connected to the second impedance. It is to be noted that condenser $C_1$ and resistor $R_1$ act as a differentiating circuit, while condenser $C_2$ and resistor $R_2$ act as an integrating circuit. If the voltage shown in Fig. 4 is applied to the input terminals of the network, the total voltage E will be set up across the resistance $R_2$ at the first moment at which the condensers $C_1$ and $C_2$ are not yet possessed of a charge, this corresponding with the first rise of the output voltage of Fig. 3. Next the charging of the condensers $C_1$ and $C_2$ starts. If the time constant $$C_2\frac{R_1R_2}{R_1+R_2}$$

exceeds the time constant $(R_1+R_2)C_2$, the condenser $C_1$ will become charged more rapidly than $C_2$, so that the output voltage decreases, corresponding with the drop of the output voltage of Fig. 3 immediately after the first voltage increase. Ultimately, when a balance is reached, the total voltage E supplied to the input terminals must become effective across the condenser $C_2$, from which follows that the aforesaid drop must again be succeeded by an increase in output voltage corresponding with the voltage increase which in Fig. 3 starts after the time $\tau$.

The network shown in Figs. 10, 11 and 12 also have the leap characteristic response curve shown in Fig. 3, as can readily be ascertained by reference to considerations similar to those given for the network of Fig. 9. In Fig. 10, by-pass condenser $C_3$ immediately passes the instantaneous rise in the applied voltage, and thereafter condenser $C_4$ is charged through resistors $R_3$ and $R_4$ to cause the drop in the characteristic curve of Fig. 3. After condenser $C_4$ attains its charge, the output voltage again rises. In Fig. 11, the resistor $R_5$ immediately passes the instantaneous rise of the applied voltage and thereafter the integrating circuit formed by condenser $C_5$ and impedance $R_6$ is charged causing the drop in the curve. The output again rises after the condenser is charged. In Fig. 12, condenser $C_6$ bypasses the instantaneous rise of the applied voltage and thereafter condensers $C_7$ and $C_8$ are charged at a rate determined by the constants of the circuit through resistors $R_7$, $R_8$ and $R_9$. After the charge is accumulated, the output voltage again rises. From the foregoing it will be evident that each network curve is characterized by an immediate rise upon the application of the voltage, then a drop for a predetermined period and thereafter a second rise to a level determined by the magnitude of applied voltage. It will further be evident that if the duration of the applied voltage is short and insufficient to permit full charging of the condensers in the network the shape of the resultant output curve will be determined by the duration of the applied voltage. The synchronizing pulses may frequently be given as current pulses instead of as voltage pulses, for example when the pulses are supplied by an amplifier tube having a high impedance characteristic. In this case, the network converting the pulses must also have a characteristic response curve of the form shown in Fig. 3, it being, however, understood that the output voltage of the network has this form when suddenly a direct current is supplied to the input terminals of the network.

What I claim is:

1. In a television system, a network adapted to derive synchronizing pulses from a composite synchronizing signal constituted by a train of horizontal synchronizing pulses of brief duration, said train being followed by a vertical synchronizing pulse of relatively prolonged duration, said vertical synchronizing pulse being serrated by a train of periodic tertiary pulses of brief duration whose repetition rate is double that of said horizontal pulses, said network comprising a pair of input terminals and a pair of output terminals, one input terminal and one output terminal being interconnected, and pulse-shaping means intercoupling said input and output terminals and including first impedance means connected between the other input terminal and the other output terminal and second impedance means connected between a point on said first impedance means and said interconnection, said first and second impedance means having time constants at which in response to an applied step voltage at the input terminals the output voltage yielded at the output terminals rises instantaneously, then drops during an interval substantially equal to the duration of one of said horizontal pulses, and then rises again, the latter rise terminating after an interval substantially equal to the time elapsing between the leading edge of said vertical pulse and the leading edge of the first pulse in said train of tertiary pulses.

2. In a television system, a network adapted to derive synchronizing pulses from a composite synchronizing signal constituted by a train of horizontal synchronizing pulses of brief duration, said train being followed by a vertical synchronizing pulse of relatively prolonged duration, said vertical synchronizing pulse being serrated by a train of periodic tertiary pulses of brief duration whose repetition rate is double that of said horizontal pulses, said network comprising a pair of input terminals and a pair of output terminals, one of said input terminals being connected to one of said output terminals, a voltage differentiating circuit coupled between the other of said input terminals and the other of said output terminals, and a voltage integrating circuit connected across said output terminals, said integrating and differentiating circuits possessing time constants at which in response to an applied step voltage at the input terminals the output voltage yielded at the output terminals rises instantaneously, then drops during an interval substantially equal to the duration of one of said horizontal pulses, and then rises again, the latter rise terminating after an interval substantially equal to the time elapsing between the leading edge of said vertical pulse and the leading edge of the first pulse in said train of tertiary pulses.

3. In a television system, a network adapted to derive synchronizing pulses from a composite synchronizing signal constituted by a train of horizontal synchronizing pulses of brief duration, said train being followed by a vertical synchronizing pulse of relatively prolonged duration, said vertical synchronizing pulse being serrated by a train of periodic tertiary pulses of brief duration whose repetition rate is double that of said horizontal pulses, said network comprising a pair of input terminals and a pair of output terminals, one of said input terminals being connected to one of said output terminals, a first condenser, a first resistor in shunted connection with said first condenser to form a differentiating circuit, said differentiating circuit being connected between the other of said input terminals and the other of said output terminals, and a second condenser and a second resistor connected in series with said second condenser across said output terminals and forming an integrating circuit, said differentiating and integrating circuits having time constants at which in response to an applied step voltage at the input terminals the output voltage yielded at the output terminals rises instantaneously, then drops for a period substantially equal to the duration of one of said horizontal pulses, and then rises again, the latter rise terminating after an interval substantially equal to the time elapsing between the leading edge of said vertical pulse and the leading edge of the first pulse in said train of tertiary pulses.

JOHAN HAANTJES.

REFERENCES CITED

The following references are of record in the file of this patent:

UNITED STATES PATENTS

| Number | Name | Date |
|---|---|---|
| 2,150,752 | Schienemann | Mar. 14, 1939 |
| 2,198,969 | Lewis | Apr. 30, 1940 |
| 2,206,695 | Guanella | July 2, 1940 |
| 2,207,775 | Bedford | July 16, 1940 |
| 2,230,803 | Klipsch et al. | Feb. 4, 1941 |

FOREIGN PATENTS

| Number | Country | Date |
|---|---|---|
| 846,887 | France | Sept. 27, 1939 |
| 110,863 | Australia | June 19, 1940 |